United States Patent
Ma et al.

(10) Patent No.: US 9,877,108 B2
(45) Date of Patent: Jan. 23, 2018

(54) USER EXPERIENCE ORIENTED AUDIO SIGNAL PROCESSING

(71) Applicant: Dolby Laboratories Licensing Corporation, San Francisco, CA (US)

(72) Inventors: Guilin Ma, Beijing (CN); Xiguang Zheng, Beijing (CN); Chen Zhang, Beijing (CN); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/519,047

(22) PCT Filed: Oct. 13, 2015

(86) PCT No.: PCT/US2015/055291
§ 371 (c)(1),
(2) Date: Apr. 13, 2017

(87) PCT Pub. No.: WO2016/061076
PCT Pub. Date: Apr. 21, 2016

(65) Prior Publication Data
US 2017/0223456 A1    Aug. 3, 2017

Related U.S. Application Data

(60) Provisional application No. 62/200,453, filed on Aug. 3, 2015.

(30) Foreign Application Priority Data

Oct. 17, 2014    (CN) .......................... 2014 1 0562080

(51) Int. Cl.
*H04R 29/00*    (2006.01)
*H04R 3/04*    (2006.01)
(Continued)

(52) U.S. Cl.
CPC ............ *H04R 3/04* (2013.01); *G10L 21/0232* (2013.01); *H04R 1/406* (2013.01); *H04R 3/005* (2013.01);
(Continued)

(58) Field of Classification Search
CPC .......... H04R 3/04; H04R 1/406; H04R 3/005; H04R 29/001; H04R 2499/11;
(Continued)

(56) References Cited

U.S. PATENT DOCUMENTS

| | | | |
|---|---|---|---|
| 6,639,987 B2 | 10/2003 | McIntosh | |
| 9,473,868 B2 * | 10/2016 | Huang | .................. H04R 1/406 |
| 2002/0086656 A1 | 7/2002 | Mattisson | |
| 2007/0223736 A1 | 9/2007 | Stenmark | |
| 2009/0215439 A1 | 8/2009 | Hamilton | |

(Continued)

FOREIGN PATENT DOCUMENTS

| | | |
|---|---|---|
| CN | 103297581 | 9/2013 |
| WO | 2014/063755 | 5/2014 |
| WO | 2014/149050 | 9/2014 |

*Primary Examiner* — Andrew L Sniezek

(57) ABSTRACT

Example embodiments disclosed herein relate to user experience oriented audio signal processing. There is provided a method for user experience oriented audio signal processing. The method includes obtaining a first audio signal from an audio sensor of an electronic device; computing, based on the first audio signal, a compensation factor for an acoustic path from the electronic device to a listener and applying the compensation factor to a second audio signal outputted from the electronic device. Corresponding system and computer program products are disclosed.

19 Claims, 2 Drawing Sheets

(51) Int. Cl.
  *H04R 1/40*    (2006.01)
  *H04R 3/00*    (2006.01)
  *G10L 21/0232* (2013.01)
  *G10L 21/0216* (2013.01)
(52) U.S. Cl.
  CPC ......... *H04R 29/001* (2013.01); *H04R 29/004* (2013.01); *H04R 29/005* (2013.01); *G10L 2021/02166* (2013.01); *H04R 2201/40* (2013.01); *H04R 2201/401* (2013.01); *H04R 2201/403* (2013.01); *H04R 2499/11* (2013.01)
(58) Field of Classification Search
  CPC ................ H04R 29/004; H04R 29/005; H04R 2201/40; H04R 2201/401; H04R 2201/403; G10L 21/0232; G10L 2021/02166
  See application file for complete search history.

(56) References Cited

U.S. PATENT DOCUMENTS

| | | |
|---|---|---|
| 2012/0057724 A1 | 3/2012 | Rabinowitz |
| 2012/0157114 A1 | 6/2012 | Alameh |
| 2013/0066453 A1 | 3/2013 | Seefeldt |
| 2013/0083948 A1 | 4/2013 | Schmidt |
| 2013/0188807 A1 | 7/2013 | Slotte |
| 2014/0003626 A1 | 1/2014 | Holman |
| 2014/0226837 A1 | 8/2014 | Grokop |
| 2014/0362253 A1* | 12/2014 | Kim ....................... H04N 5/262 348/231.4 |
| 2016/0021481 A1* | 1/2016 | Johnson .................. H04R 3/12 381/303 |

* cited by examiner

USER EXPERIENCE ORIENTED AUDIO SIGNAL PROCESSING

CROSS-REFERENCE TO RELATED APPLICATIONS

This application claims priority to Chinese Patent Application No. 201410562080.X filed 17 Oct. 2014 and U.S. Provisional Patent Application No. 62/200,453 filed 3 Aug. 2015, which are hereby incorporated by reference in their entirety.

TECHNOLOGY

Example embodiments disclosed herein generally relate to audio signal processing and more specifically, to a method and system for user experience oriented audio signal processing.

BACKGROUND

In recent years, user experience has become more and more important for the design of electronic devices. An electronic device may include, for example a portable device such as a mobile phone, a tablet computer, or a fixed device (e.g., a telephone or a desktop computer).

Due to structural limitations, it is difficult to solve the audio effect issue of electronic devices by hardware design. By way of example, the speakers in electronic devices may be too small to generate good audio effect. In addition, the design of speaker locations and firing directions is subject to practical constraints.

To improve user experience, post processing has been applied to audio signals of electronic devices. For example, the audio signals may be processed by equalization, virtual bass, bass enhancement, loudness adjustment, steering stereo rendering, acoustic echo cancellation, acoustic noise cancellation, de-reverberation, and so forth. However, since electronic devices may have great flexibility with regards to the position and orientation, it is difficult to effectively control the timbre due to the speaker directivity and the change of air acoustic impedance by existing post processing solutions.

In view of the foregoing, there is a need in the art for a solution enabling user experience oriented audio signal processing.

SUMMARY

In order to address the foregoing and other potential problems, the example embodiments disclosed herein provide a method and system for the user experience oriented audio signal processing.

In one aspect, example embodiments disclosed herein provide a method for the user experience oriented audio signal processing. The method includes obtaining a first audio signal from an audio sensor of an electronic device, computing, based on the first audio signal, a compensation factor for an acoustic path from the electronic device to a listener and applying the compensation factor to a second audio signal to be outputted from the electronic device. Embodiments in this regard further include a corresponding computer program product.

In another aspect, example embodiments disclosed herein provide a system for the user experience oriented audio signal processing. The system includes an audio signal obtaining unit configured to obtain a first audio signal from an audio sensor of an electronic device; a computing unit configured to compute, based on the first audio signal, a compensation factor for an acoustic path from the electronic device to a listener and an applying unit configured to apply the compensation factor to a second audio signal to be outputted from the electronic device.

Through the following description, it would be appreciated that in accordance with example embodiments, a compensation factor for an acoustic path from the electronic device to a listener will be computed and applied to audio signals before submitting the audio signals to the listener. For example, by computing the compensation factor at least in part based on audio signals obtained from an audio sensor of the electronic device, it is possible to effectively improve audio effect of the electronic device. As a result, an audible improvement on user experience is achieved no matter how the electronic device is positioned and oriented.

DESCRIPTION OF DRAWINGS

Through the following detailed description with reference to the accompanying drawings, the above and other objectives, features and advantages of example embodiments will become more comprehensible. In the drawings, several embodiments disclosed herein will be illustrated in an example and non-limiting manner, wherein.

Throughout the drawings, the same or corresponding reference symbols refer to the same or corresponding parts.

DESCRIPTION OF EXAMPLE EMBODIMENTS

The subject matter described herein will now be discussed with reference to several example embodiments. It should be understood that these embodiments are discussed only for the purpose of enabling those skilled persons in the art to better understand and thus implement the subject matter described herein, rather than suggesting any limitation on the scope of the subject matter.

The terminology used herein is for the purpose of describing particular embodiments only, and is not intended to be limited to the example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Figure 1:
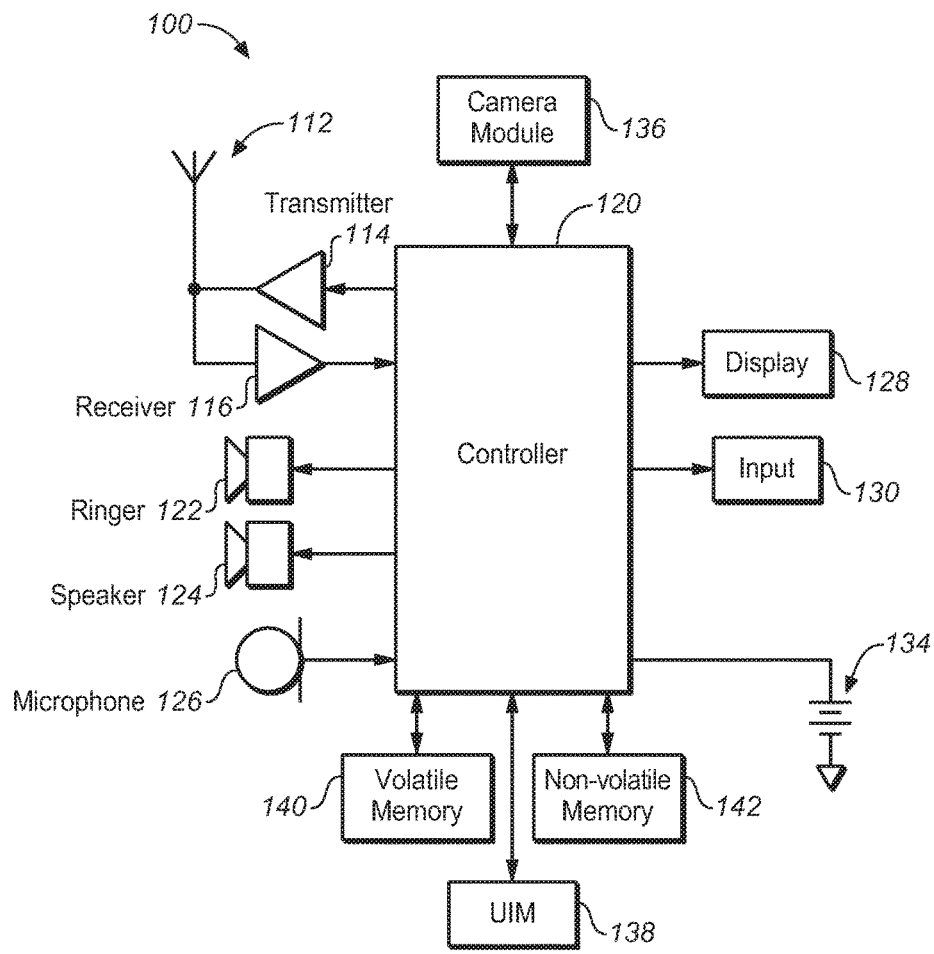
FIG. 1 illustrates a block diagram of an example electronic device suitable for implementing example embodiments.

FIG. 1 illustrates a block diagram of an example electronic device 100 suitable for implementing example embodiments. As shown, the electronic device 100 is implemented as a portable device with audio playing capability. The portable device may be for example, a mobile phone, a portable digital assistant (PDA), a laptop, a tablet computer, a pager, a player, a game apparatus, a camera, a Global Position System (GPS) device, and any other types of portable devices as long as they can adopt embodiments of the subject matter described herein. A fixed-type device, such as a desktop computer and a telephone, may likewise easily use embodiments of the subject matter described herein.

As shown, the electronic device 100 includes one or more antennas 112 operable to communicate with the transmitter 114 and the receiver 116. With these devices, the electronic device 100 may perform wireless communications.

The electronic device 100 further includes at least one controller 120. It should be understood that the controller 120 comprises circuits or logic required to implement the functions of the electronic device 100. For example, the controller 120 may include a digital signal processor, a microprocessor, an A/D converter, a D/A converter, and/or any other suitable circuits. The control and signal processing functions of the electronic device 100 are allocated in accordance with respective capabilities of these devices.

The electronic device 100 may further comprise a user interface, which, for example, may include a ringer 122, a speaker 124, a microphone 126, a display 128, and an input interface 130, and all of the above are coupled to the controller 120. The electronic device 100 may further include a camera module 136 for capturing static and/or dynamic images. Still further, the electronic device 100 may include a plurality of sensors (not shown), for example, an audio sensor, a gyroscope, a proximity sensor, a gravity sensor, an accelerometer, a temperature sensor, a light sensor, a magnetic field sensor, a pressure sensor, a humidity sensor, a positioning sensor, and the like. The audio sensor may be implemented as, by way of example, the microphone 126, a microphone array (not shown), and the like.

The electronic device 100 may further comprise a battery 134, such as a vibrating battery set, for supplying power to various circuits required for operating the electronic device 100, and alternatively providing mechanical vibration as detectable output. In one embodiment, the electronic device 100 may further comprise a user identification module (UIM) 138. The UIM 138 is usually a memory device with a processor built in. The UIM 138 may, for example, comprise a subscriber identification module (SIM), a universal integrated circuit card (UICC), a universal user identification module (USIM), or a removable user identification module (R-UIM), and the like. The UIM 138 may comprise a card connection detecting apparatus according to embodiments of the subject matter described herein.

The electronic device 100 may further comprise a memory. For example, the electronic device 100 may comprise a volatile memory 140, for example, comprising a volatile random access memory (RAM) in a cache area for temporarily storing data. The electronic device 100 may further comprise other non-volatile memory 142 which may be embedded and/or movable. The non-volatile memory 142 may additionally or alternatively include for example, EEPROM and flash memory, and the like. The memory may store any item in the plurality of information segments and data used by the electronic device 100 so as to implement the functions of the electronic device 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Figure 2:
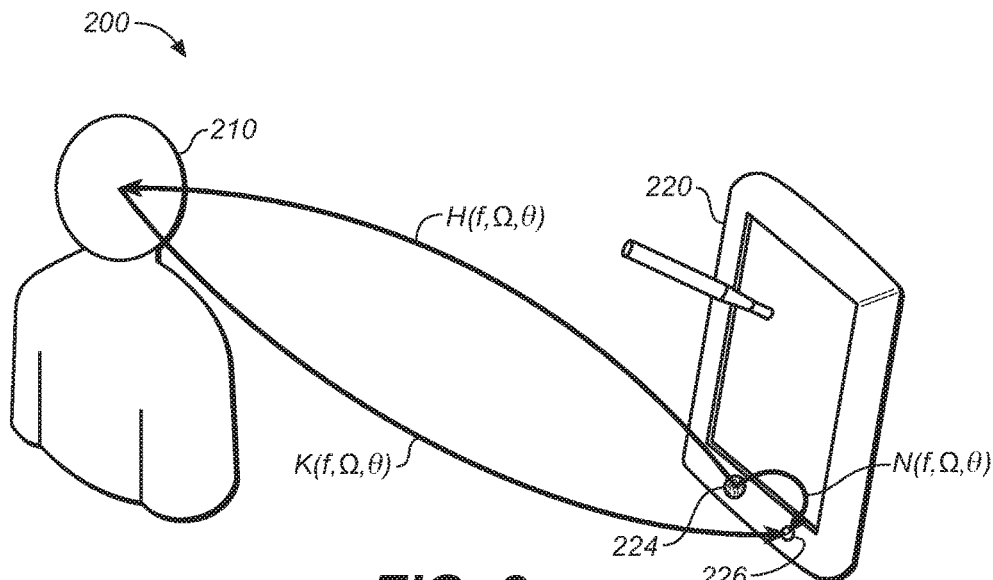
FIG. 2 illustrates a schematic diagram of a scenario suitable for implementing example embodiments.

Reference is now made to FIG. 2, which illustrates a schematic diagram of a scenario 200 suitable for implementing example embodiments of the present invention. As shown, a listener 210 is listening to audio sound, e.g., music, speech, radio play, and so forth, from an electronic device 220. In one embodiment, the electronic device 220 may be implemented by the electronic device 100 as shown in FIG. 1, for example.

A transfer function of audio playback through the speaker 224 of the portable device 220 may involve audio processing in the electronic device, denoted as $A(f)$, speaker frequency response, denoted as $L(f)$, and a transfer function from the speaker 224 to the listener 210 (for example, the head position of the listener 210), denoted as $H(f, \Omega, \theta)$. $\Omega$ represents a set of parameters defining the proximity factors, e.g., objects area and their distance to the speaker 224, and $\theta$ represents a set of parameters defining the orientation of the electronic device 220 relative to the head and orientation of the listener. Assume that the target or ideal transfer function of the audio playback through the speaker 224 is $T(f)$, we would like to achieve:

$$A(f)L(f)H(f,\Omega,\theta)=T(f). \quad (1)$$

As the electronic device 220 may be used in very dynamic environments and subject to rotation, $\Omega$ and $\theta$ may change dramatically. As a result, $H(f, \Omega, \theta)$ may change. To satisfy equation (1), a compensation factor, denoted as $P(f, \Omega, \theta)$, may be introduced so that $$A(f)P(f,\Omega,\theta)L(f)H(f,\Omega,\theta)=T(f). \quad (2)$$

According to example embodiments, $P(f, \Omega, \theta)$ represents an orientation and proximity dependent audio processing, which may be regarded as a post-processing constantly trying to counteract the deviation of $H(f, \Omega, \theta)$.

For compensating orientation and proximity change, there is need to identify $P(f, \Omega, \theta)$ to counteract the deviation of $H(f, \Omega, \theta)$. In this regard, example embodiments of the present invention propose to compute, in real time, the compensation factor $P(f, \Omega, \theta)$ based on audio signals obtained from an audio sensor (for example, the microphone 226) of the electronic device 220. By applying the compensation factor, audio signals of the electronic device 220 may be compensated before being submitted to the listener 210. In this way, an equalization process may be implemented and audible improvement of user experience may be achieved. Related details will be described below in connection with example embodiments in FIGS. 3 and 4.

Figure 3:
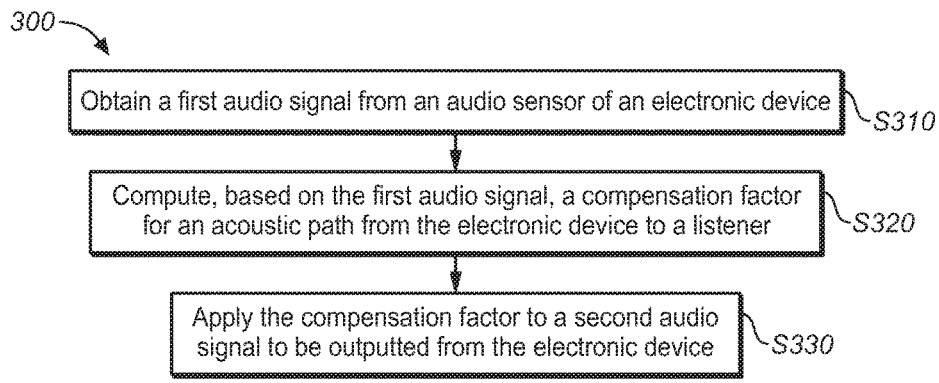
FIG. 3 illustrates a flowchart of a method for user experience oriented audio signal processing in accordance with example embodiments.

Reference is now made to FIG. 3, which illustrates a flowchart of a method 300 for user experience oriented audio signal processing in accordance with example embodiments. The method 300 may be at least in part implemented by the electronic device 220, for example.

At step S310, a first audio signal is obtained from an audio sensor of an electronic device.

According to example embodiments disclosed here, the audio sensor may be implemented in various ways. For example, the audio sensor may be implemented as a microphone, a microphone array, and/or any other suitable audio sensor as long as it is capable of sensing or collecting audio signal(s) outputted from the electronic device.

As shown in FIG. 2, the audio sensor may be implemented as the microphone 226. A transfer function for an acoustic path from the speaker 224 to the microphone 226 may be defined as $N(f, \Omega, \theta)$, and the difference between the speaker 224 to the microphone 226 and the speaker 224 to the listener 210, corresponding to the transfer function from the microphone 226 to the listener 210, may be defined as $K(f, \Omega, \theta)$, where $$K(f,\Omega,\theta)=N(f,\Omega,\theta)/H(f,\Omega,\theta). \quad (3)$$

In some example embodiments, the listener 210 may normally look ahead and place the electronic device 220 right in front of him/her with a comfortable distance. In this event, the relation between the listener 210 and the microphone 226 of the electronic device 220 may be roughly constant. Therefore, $K(f, \Omega, \theta)$ may be independent of $\Omega$ and $\theta$. In other words, all changes caused by the change of orientation and/or proximity may be equivalently embedded in $N(f, \Omega, \theta)$ and $H(f, \Omega, \theta)$.

When the audio sensor is implemented as the microphone 226 as shown in FIG. 2, at step S310, microphone recordings, for example, ambient sound collected at the microphone may be obtained as the first audio signal.

In some other example embodiments, relative orientation and distance between the listener 210 (for example, his/her head) and the microphone 226 are not constant, for example, due to the listener 210 turning his/her head to a position, the microphone 226 being covered unintentionally by the listener 210, and/or the like. For these situations, the change in $H(f, \Omega, \theta)$ may not be fully embedded in $N(f, \Omega, \theta)$. In this case, the audio sensor may be implemented as a microphone array (not shown).

The microphone array of the electronic device 220 may comprise a plurality of microphones. The plurality of microphones has the advantage of describing the orientation $\Omega$ with better resolution. The proximity effects may be asymmetric around the speakers. With information from the plurality of microphones, asymmetric proximity modes may be supported.

Further, for real-time implementation, the plurality of microphones may provide a more robust compensation factor. In the practical use of electronic devices, it is possible for a microphone to be covered or blocked unintentionally by hands. The chance of covering all microphones is much lower. Therefore, more robust results may be achieved based on the healthy microphones.

Still further, in some example embodiments, one or more additional devices, such as a camera, a gyroscope, a proximity sensor, a gravity sensor, an accelerometer, a temperature sensor, a light sensor, a magnetic field sensor, a pressure sensor, a humidity sensor, a positioning sensor, and/or the like, may be employed to aid the audio sensor-based compensation. By way of example, when a significant difference is observed in the microphone recording, one possibility is that the orientation of the electronic device is changing. Another possibility is that the noise or other disturbance is occurring such that even the orientation of the electronic device is not changing, the microphone recording has been changed. In this case, additional device inputs may assist the audio sensor to maintain the current processing or perform less aggressive processing. For instance, multiple microphones may be used solely or together with cameras to calculate the head position of the listener 210 and orientation thereof. While the listener 210 is speaking, the microphone array may find out the orientation of the listener's head. In addition, since typically the utterance is near field, the distance cue may be preserved. In this way, both distance and orientation information of the listener may be obtained.

At step S310, in example embodiments where the audio sensor is implemented as a microphone array, conditions of one or more microphones of the microphone array may be determined first. The condition of each microphone of the microphone array may be determined based on the deviation from normal broadband sensitivity or similar quantities. Based on the determined conditions, beam-forming may be performed towards a position of the speaker 224. By way of example, multiple microphones of the microphone array may form a near-field beam-forming pointing towards the speaker position. Then, ambient sound collected at the beam-formed microphone array may be obtained as the first audio signal. In this way, the audio playback to ambient noise ratio can be increased, which may improve the robustness of the real-time adjustment.

In addition, it is to be understood that the above example embodiments are only for the purpose of illustration, without suggesting any limitation on the subject matter described herein. The audio sensor of the electronic device may be implemented in any other suitable forms as long as it is capable of obtaining audio signals outputted from the electronic device.

At step S320, a compensation factor for an acoustic path from the electronic device to a listener is computed based on the first audio signal.

According to example embodiments, the compensation factor may be computed in various ways. By way of example, the compensation factor may be computed by matching a target frequency response. In particular, a nominal audio signal of the audio sensor may be calculated based on a nominal transfer function of the acoustic path. By estimating ambient noise around the electronic device, the compensation factor may be at least partially computed based on the first audio signal, the nominal audio signal and the ambient noise. Details will be introduced in connection with example embodiments of FIG. 4.

In another example embodiment, instead of matching the target response directly, the compensation factor may be computed based on a transfer function of an acoustic path from the speaker 224 to the microphone 226, which may be estimated by, for example, a real-time system identification. System identification methods, for example such as adaptive filtering may be used to estimate the magnitude and phase as we know the excitation audio signal. The transfer function of the acoustic path from the speaker 224 to the microphone 226 captured by this process may be $$W(f,\Omega,\theta)=A(f)P(f,\Omega,\theta)L(f)H(f,\Omega,\theta)K(f)S(f) \quad (4)$$

where $A(f)$ represents audio processing in the electronic device, $L(f)$ represents speaker frequency response, $H(f, \Omega, \theta)$ represents the transfer function of the acoustic path from the speaker 224 to the listener 210, $K(f)$ represents a simplification of $K(f, \Omega, \theta)$ which represents the transfer function from the microphone 226 to the listener 210, and $S(f)$ represents the frequency response of the microphone 226.

In some example embodiments, the compensation factor $P(f, \Omega, \theta)$ may be adjusted to counteract the change in the estimated transfer function, to keep $W(f, \Omega, \theta)$ constant and independent of $\Omega$ and $\theta$.

The system identification may be very slow due to, for example, a high ambient noise level, a highly self-correlated audio signal and the like. Alternatively or additionally, for speeding up the system identification, for instance, when a fast rotation of the electronic device 220 or environment change is detected for example through gyrosensors, a probe signal, for example, Maximum-Length-Sequence, may be injected to quickly determine the transfer function. The probe signal may be injected below a masking threshold so that it is inaudible. Alternatively, other typical adaptive filtering methods, for example, decorrelation methods may be applicable to speed up the system identification.

According to example embodiments disclosed herein, optionally, the real-time implementation of the compensation factor may be combined with presets. The presets may include various kinds of equalization processing. The various kinds of equalization processing may be predefined or obtained in various ways according to existing solutions and may be stored in a memory in advance. As can be appreciated by a person skilled in the art, the memory may be a portable computer magnetic disk, hard disk, random access memory (RAM), read-only memory (ROM), erasable programmable read-only memory (EPROM or flash), portable compact disk read-only memory (CD-ROM), optical storage device, a magnetic storage device, and/or the like.

In some example embodiments, an upper limit and a lower limit may be determined for the compensation factor, and the compensation factor may be computed in a range from the upper limit to the lower limit. By way of example, the upper limit and the lower limit may be determined in various ways. For example, information about orientation and proximity of the electronic device may be obtained, and then a plurality of presets may be selected for the compensation factor based on the information about orientation and proximity. In this way, the upper limit and the lower limit may be determined based on the selected presets.

In some other example embodiments, the upper limit and the lower limit may be determined based on recordings of the audio sensor. By way of example, a plurality of presets for the compensation factor may be selected based on the first audio signal obtained at step S310, and then the upper limit and the lower limit may be determined based on the plurality of presets.

In this way, the computation of the compensation factor can be speeded up and can be constrained from going wrong. For example, the presets under extreme cases, for example, a free field, a speaker of the electronic device facing down, and so forth, may be used to constrain the compensation factor to make sure it is always within a reasonable range.

According to example embodiments disclosed herein, the compensation factor may need smoothing both temporally and spectrally. In some example embodiments, at step S320, the compensation factor may be temporally smoothed or spectrally smoothed. The temporal smoothing may prevent abrupt change in the timbre and loudness. The spectral smoothing may avoid high-Q processing that usually causes audible artifacts due to limited speaker capabilities. Both spectral and temporal smoothing help alleviate the problem of time aliasing.

It is to be noted that temporally or spectrally smoothing may also be provided as an example embodiment. In some example embodiments, the compensation factor may be applied at step S330 without any smoothing.

Still with reference to FIG. 3, the method 300 proceeds to step 330 to apply the compensation factor to a second audio signal to be outputted from the electronic device.

The audio signal to be outputted from the electronic device 220, for example, from the speaker 224, may be referred to as the second audio signal. By applying the compensation factor to the second audio signal, audible improvement of user experience can be achieved.

Figure 4:
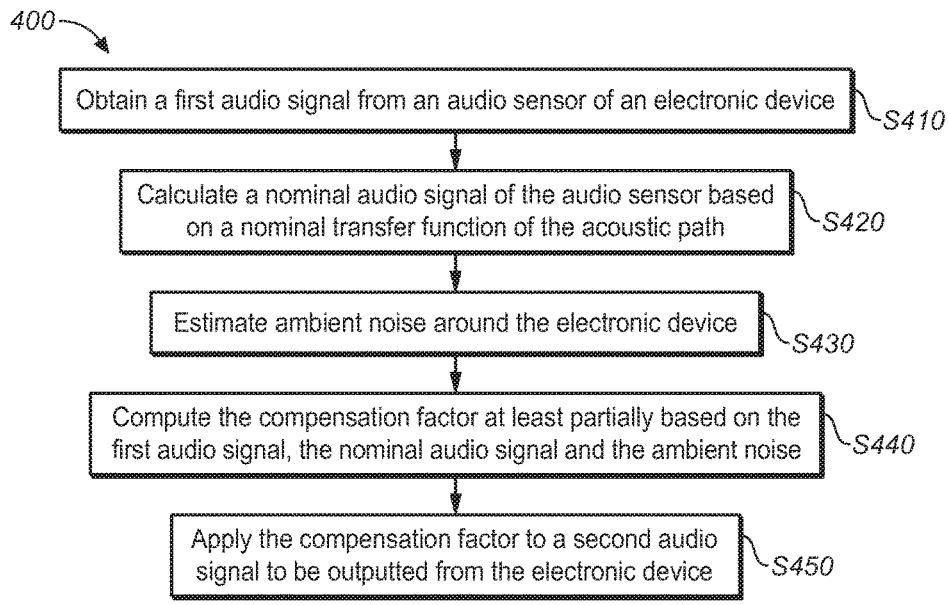
FIG. 4 illustrates a flowchart of a method for user experience oriented audio signal processing in accordance with example embodiments.

FIG. 4 illustrates a flowchart of a method 400 for user experience oriented audio signal processing in accordance with example embodiments of the present invention. The method 400 may be considered as an embodiment of the method 300 described above with reference to FIG. 3. However, it is noted that this is only for the purpose of illustrating the principles of the example embodiments, rather than limiting the scope thereof. The method 400 may be at least in part implemented by the electronic device 220, for example.

The method 400 is entered at step S410, where a first audio signal is obtained from an audio sensor of an electronic device. Step S410 in method 400 may be considered as being similar to step S310 in method 300 as described above. According to example embodiments, the audio sensor may be implemented as a microphone, a microphone array, and/or any other suitable audio sensor as long as it is capable of sensing or collecting audio signal(s) outputted from the electronic device. Ambient sound collected or sensed by the audio sensor may be obtained as the first audio signal.

At step S420, a nominal audio signal of the audio sensor is calculated based on a nominal transfer function of the acoustic path.

According to example embodiments of the present invention, the nominal transfer function of the acoustic path may be denoted as $H(f, \Omega_0, \theta_0)$, which represents the transfer function under free-field condition or in a space without significant reflections from objects around. The nominal audio signal of the audio sensor may be nominal microphone recording which is denoted as $M_0(f)$ and defined as:

$$M_0(f)=A(f)P(f,\Omega_0,\theta_0)L(f)H(f,\Omega_0,\theta_0)K(f)S(f)X(f), \quad (5)$$

where $A(f)$ represents audio processing in the electronic device 220; $L(f)$ represents speaker frequency response; $K(f)$ represents a simplification of $K(f, \Omega, \theta)$ which is the transfer function from the microphone 226 to the listener 210; $S(f)$ represents the frequency response of microphone and $X(f)$ represents an original (or unprocessed) audio signal. $P(f, \Omega_0, \theta_0)$ may be pre-determined so that $$A(f)P(f,\Omega_0,\theta_0)L(f)H(f,\Omega_0,\theta_0)=T(f), \quad (6)$$

where $T(f)$ represents the target transfer function of the audio playback through the speaker 224.

At step S430, ambient noise around the electronic device is estimated.

According to example embodiments disclosed herein, ambient noise around the electronic device may be estimated in various ways, for example, by estimating signal to noise ratio (SNR), which may be found in existing techniques and thus omitted here.

At step S440, the compensation factor at least partially is computed based on the first audio signal, the nominal audio signal and the ambient noise.

According to example embodiments, the first audio signal is the audio signal collected at the audio sensor (e.g., the microphone 126/226). In some example embodiments, the first audio signal may be the real-time recording $M_c(f)$ of the microphone 226 and may be obtained as follows:

$$M_c(f)=A(f)P(f,\Omega_c,\theta_c)L(f)H(f,\Omega,\theta)K(f)S(f)X(f)+N(f) \quad (7)$$

where $N(f)$ represents the ambient noise, $P(f, \Omega_c, \theta_c)$ represents a compensation factor associated with the current orientation and proximity processing. For achieving the target response, $P(f, \Omega_c, \theta_c)$ may be adjusted to a new compensation factor, $P(f, \Omega_n, \theta_n)$, so that the new microphone recording satisfies $$M_n(f) - N(f) = M_0(f), \quad (8)$$

where $$M_n(f) = A(f)P(f,\Omega_n,\theta_n)L(f)H(f,\Omega,\theta)K(f)S(f)X(f) + N(f) \quad (9)$$

According to equations (5), (7), (8) and (9), the compensation factor $P(f, \Omega_n, \theta_n)$ may be calculated as follows:

$$P(f,\Omega_n,\theta_n) = P(f,\Omega_c,\theta_c)(M_0(f)/(M_c(f) - N(f))) \quad (10)$$

According to example embodiments, at step S440, whether the ambient noise estimated at step S430 is negligible may be determined, for example by determining whether it exceeds a predetermined threshold. If the ambient noise does not exceed the predetermined threshold, the ambient noise may be neglected and the compensation factor may be computed at least partially based on the first audio signal $M_c(f)$ and the nominal audio signal $M_0(f)$. For example, the magnitude difference between $M_0(f)$ and $M_c(f)$ may be calculated, and the new compensation factor $P(f, \Omega_n, \theta_n)$ may be obtained by applying the calculated magnitude difference to the current orientation and proximity processing $P(f, \Omega_c, \theta_c)$.

On the other hand, if the ambient noise is not negligible, for example, it exceeds the predetermined threshold, the compensation factor may be computed at least partially based on time averaging of the first audio signal and the nominal audio signal. In some example embodiments, the time averaging of the first audio signal and the nominal audio signal may be obtained as follows:

$$E[M_c(f)/M_0(f)] = P(f,\Omega_c,\theta_c)H(f,\Omega_c,\theta_c)/(P(f,\Omega_0,\theta_0)H(f,\Omega_0,\theta_0)) + E[N(f)/(A(f)P(f,\Omega_0,\theta_0)L(f)H(f,\Omega_0,\theta_0)K(f)S(f)X(f))] = P(f,\Omega_c,\theta_c)H(f,\Omega_c,\theta_c)/(P(f,\Omega_0,\theta_0)H(f,\Omega_0,\theta_0)) \quad (11)$$

where E[ ] represents an expectation operator and may be approximated by time averaging. The last equality comes from the fact that ambient noise $N(f)$ and audio signal $X(f)$ are uncorrelated. To match the target response, the following equation should be met:

$$P(f,\Omega_n,\theta_n)H(f,\Omega,\theta) = P(f,\Omega_0,\theta_0)H(f,\Omega_0,\theta_0) \quad (12)$$

According to equations (11) and (12), the new compensation factor $P(f, \Omega_n, \theta_n)$ may be obtained as follows:

$$P(f,\Omega_n,\theta_n) = P(f,\Omega_c,\theta_c)E[M_0(f)/M_c(f)] \quad (13)$$

According to another example embodiments, if the ambient noise is not negligible, instead of matching the target response directly, the compensation factor may be computed based on a transfer function of an acoustic path from the speaker 124 to the microphone 226, wherein the transfer function may be estimated by, for example, real-time system identification. Details may be found in descriptions with respect to step S320.

Still with reference to FIG. 4, the method 400 proceeds to step S450 to apply the compensation factor to a second audio signal to be outputted from the electronic device. By applying the compensation factor to the second audio signal, an equalization process may be implemented. In this way, audible improvement of the user experience can be achieved.

Figure 5:
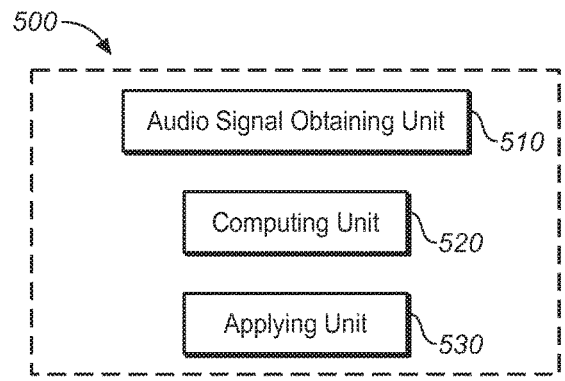
FIG. 5 illustrates a block diagram of a system for user experience oriented audio signal processing in accordance with example embodiments.

Reference is now made to FIG. 5, which illustrates a simplified block diagram of a system 500 for improving audio quality in accordance with example embodiments disclosed herein. The system 500 may be at least in part implemented at the electronic device 220, for example. As shown, the system 500 includes an audio signal obtaining unit 510 configured to obtain a first audio signal from an audio sensor of an electronic device; a computing unit 520 configured to compute, based on the first audio signal, a compensation factor for an acoustic path from the electronic device to a listener; and an applying unit 530 configured to apply the compensation factor to a second audio signal to be outputted from the electronic device.

In some example embodiments, the audio sensor may include a microphone, and the audio signal obtaining unit 510 may include an ambient sound obtaining unit configured to obtain ambient sound collected at the microphone as the first audio signal.

In some example embodiments, the audio sensor may include a microphone array, and the audio signal obtaining unit 510 may include a condition determining unit configured to determine conditions of one or more microphones of the microphone array a beam-forming unit configured to perform, based on the determined conditions, beam-forming towards a position of a speaker of the electronic device; and an ambient sound obtaining unit configured to obtain ambient sound collected at the beam-formed microphone array as the first audio signal.

In some example embodiments, the audio signal obtaining unit 510 may comprise: an assisting unit configured to using at least one of the following devices to assist in obtaining the first audio signal: a camera, a gyroscope, a proximity sensor, a gravity sensor, an accelerometer, a temperature sensor, a light sensor, a magnetic field sensor, a pressure sensor, a humidity sensor, and a positioning sensor.

In some example embodiments, the computing unit 520 may include a calculating unit configured to calculate a nominal audio signal of the audio sensor based on a nominal transfer function of the acoustic path and a noise estimating unit configured to estimate ambient noise around the electronic device. The computing unit 520 may be further configured to compute the compensation factor at least partially based on the first audio signal, the nominal audio signal and the ambient noise.

In some example embodiments, the computing unit 520 may include a determining unit configured to determine whether the ambient noise exceeds a predetermined threshold. The computing unit 520 may be further configured to, responsive to determining that the ambient noise does not exceed the predetermined threshold, compute the compensation factor at least partially based on the first audio signal and the nominal audio signal. The computing unit 520 may be further configured to, responsive to determining that the ambient noise exceeds the predetermined threshold, compute the compensation factor at least partially based on time averaging of the first audio signal and the nominal audio signal.

In some example embodiments, the computing unit 520 may include a path estimating unit configured to estimate a transfer function of an acoustic path from a speaker of the electronic device to the audio sensor. The computing unit 520 may be further configured to compute the compensation factor at least in part based on the estimated transfer function.

In some example embodiments, the computing unit 520 may comprise: a limit determining unit configured to determine an upper limit and a lower limit for the compensation factor. The computing unit 520 may be further configured to compute the compensation factor in a range between the upper limit and the lower limit.

In some example embodiments, the limit determining unit may include an information obtaining unit configured to obtain information about orientation and proximity of the electronic device and a selecting unit configured to select a plurality of presets for the compensation factor based on the information about orientation and proximity. The limit determining unit may be further configured to determine the upper limit and the lower limit based on the plurality of presets.

In some example embodiments, the limit determining unit may include a selecting unit configured to select a plurality of presets for the compensation factor based on the first audio signal. The limit determining unit may be further configured to determine the upper limit and the lower limit based on the plurality of presets.

In some example embodiments, the computing unit 520 may further include at least one of: a temporally smoothing unit configured to temporally smooth the compensation factor; and a spectrally smoothing unit configured to spectrally smooth the compensation factor.

The units included in the system 500 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the system 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

It will be appreciated that the embodiments of the present invention are not to be limited to the specific embodiments as discussed above and that modifications and other embodiments are intended to be included within the scope of the appended claims. Although specific terms are used herein, they are used in a generic and descriptive sense only and not for purposes of limitation.

We claim:

1. A method for user experience oriented audio signal processing, the method comprising:
   obtaining a first audio signal from an audio sensor of an electronic device, the audio sensor including a microphone array configured for collecting ambient sound, wherein obtaining the first audio signal further comprises:
   determining conditions of one or more microphones of the microphone array;
   performing, based on the determined conditions, beamforming towards a position of a speaker of the electronic device; and
   obtaining ambient sound collected at the beam-formed microphone array as the first audio signal;

computing, based on the first audio signal, a compensation factor for an acoustic path from the electronic device to a listener; and applying the compensation factor to a second audio signal to be outputted from the electronic device.

2. The method of claim 1 wherein obtaining the first audio signal comprises:

using at least one of the following devices to assist in obtaining the first audio signal: a camera, a gyroscope, a proximity sensor, a gravity sensor, an accelerometer, a temperature sensor, a light sensor, a magnetic field sensor, a pressure sensor, a humidity sensor, and a positioning sensor.

3. The method of claim 1 wherein computing the compensation factor comprises:

calculating a nominal audio signal of the audio sensor based on a nominal transfer function of the acoustic path;

estimating ambient noise around the electronic device; and computing the compensation factor at least partially based on the first audio signal, the nominal audio signal and the ambient noise.

4. The method of claim 3 wherein computing the compensation factor comprises:

determining whether the ambient noise exceeds a predetermined threshold;

responsive to determining that the ambient noise does not exceed the predetermined threshold, computing the compensation factor at least partially based on the first audio signal and the nominal audio signal; and responsive to determining that the ambient noise exceeds the predetermined threshold, computing the compensation factor at least partially based on time averaging of the first audio signal and the nominal audio signal.

5. The method of claim 1, wherein computing the compensation factor comprises:

estimating a transfer function of an acoustic path from a speaker of the electronic device to the audio sensor; and computing the compensation factor at least in part based on the estimated transfer function.

6. The method of claim 1 wherein computing the compensation factor comprises:

determining an upper limit and a lower limit for the compensation factor; and computing the compensation factor in a range between the upper limit and the lower limit.

7. The method of claim 6 wherein determining the upper limit and the lower limit comprises:

obtaining information about orientation and proximity of the electronic device;

selecting a plurality of presets for the compensation factor based on the information about orientation and proximity; and determining the upper limit and the lower limit based on the plurality of presets.

8. The method of claim 6 wherein determining the upper limit and the lower limit comprises:

selecting a plurality of presets for the compensation factor based on the first audio signal; and determining the upper limit and the lower limit based on the plurality of presets.

9. The method of claim 1 wherein computing the compensation factor further comprises at least one of:

temporally smoothing the compensation factor; and spectrally smoothing the compensation factor.

10. A computer program product for user experience oriented audio signal processing, the computer program product being tangibly stored on a non-transient computer-readable medium and comprising machine executable instructions which, when executed, cause the machine to perform steps of the method according to claim 1.

11. A system for user experience oriented audio signal processing, the system comprising:

an audio signal obtaining unit configured to obtain a first audio signal from an audio sensor of an electronic device, the audio sensor including a microphone array configured for collecting ambient sound, wherein obtaining the first audio signal further comprises:

determining conditions of one or more microphones of the microphone array;

performing, based on the determined conditions, beamforming towards a position of a speaker of the electronic device; and obtaining ambient sound collected at the beam-formed microphone array as the first audio signal;

a computing unit configured to compute, based on the first audio signal, a compensation factor for an acoustic path from the electronic device to a listener; and an applying unit configured to apply the compensation factor to a second audio signal to be outputted from the electronic device.

12. The system of claim 11 wherein the audio signal obtaining unit comprises:

an assisting unit configured to using at least one of the following devices to assist in obtaining the first audio signal: a camera, a gyroscope, a proximity sensor, a gravity sensor, an accelerometer, a temperature sensor, a light sensor, a magnetic field sensor, a pressure sensor, a humidity sensor, and a positioning sensor.

13. The system of claim 11 wherein the computing unit comprises:

a calculating unit configured to calculate a nominal audio signal of the audio sensor based on a nominal transfer function of the acoustic path;

a noise estimating unit configured to estimate ambient noise around the electronic device; and wherein the computing unit is further configured to compute the compensation factor at least partially based on the first audio signal, the nominal audio signal and the ambient noise.

14. The system of claim 13 wherein the computing unit comprises a determining unit configured to determine whether the ambient noise exceeds a predetermined threshold;

wherein the computing unit is further configured to, responsive to determining that the ambient noise does not exceed the predetermined threshold, compute the compensation factor at least partially based on the first audio signal and the nominal audio signal; and wherein the computing unit is further configured to, responsive to determining that the ambient noise exceeds the predetermined threshold, compute the compensation factor at least partially based on time averaging of the first audio signal and the nominal audio signal.

15. The system of claim 11 wherein the computing unit comprises:

a path estimating unit configured to estimate a transfer function of an acoustic path from a speaker of the electronic device to the audio sensor; and wherein the computing unit is further configured to compute the compensation factor at least in part based on the estimated transfer function.

16. The system of claim 11 wherein the computing unit comprises:
a limit determining unit configured to determine an upper limit and a lower limit for the compensation factor; and
wherein the computing unit is further configured to compute the compensation factor in a range between the upper limit and the lower limit.

17. The system of claim 16 wherein the limit determining unit comprises:
an information obtaining unit configured to obtain information about orientation and proximity of the electronic device;
a selecting unit configured to select a plurality of presets for the compensation factor based on the information about orientation and proximity; and
wherein the limit determining unit is further configured to determine the upper limit and the lower limit based on the plurality of presets.

18. The system of claim 16 wherein the limit determining unit comprises:
a selecting unit configured to select a plurality of presets for the compensation factor based on the first audio signal; and
wherein the limit determining unit is further configured to determine the upper limit and the lower limit based on the plurality of presets.

19. The system of claim 11 wherein the computing unit further comprises at least one of:
a temporally smoothing unit configured to temporally smooth the compensation factor; and
a spectrally smoothing unit configured to spectrally smooth the compensation factor.

* * * * *